(12) United States Patent
Marlin

(10) Patent No.: US 7,576,022 B2
(45) Date of Patent: Aug. 18, 2009

(54) ALUMINUM-AND MAGNESIUM-BASED MOLTEN CERAMIC GRAINS

(75) Inventor: Samuel Marlin, Plan d'Orgon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 108 days.

(21) Appl. No.: 10/553,438

(22) PCT Filed: Apr. 15, 2004

(86) PCT No.: PCT/FR2004/000927

§ 371 (c)(1),
(2), (4) Date: Oct. 14, 2005

(87) PCT Pub. No.: WO2004/094554

PCT Pub. Date: Nov. 4, 2004

(65) Prior Publication Data

US 2006/0196123 A1 Sep. 7, 2006

(30) Foreign Application Priority Data

Apr. 17, 2003 (FR) .................................. 03 04820

(51) Int. Cl.
*C04B 35/03* (2006.01)
*C04B 35/04* (2006.01)
*C04B 35/44* (2006.01)
*C04B 35/00* (2006.01)
*B24D 3/02* (2006.01)
*C09C 1/68* (2006.01)
*C09K 3/14* (2006.01)

(52) U.S. Cl. ...................... 501/119; 501/108; 501/118; 501/120; 501/121; 501/153; 51/307; 51/309

(58) Field of Classification Search ................... 51/307, 51/309; 501/108, 118, 119, 120, 121, 127, 501/153
See application file for complete search history.

(56) References Cited

U.S. PATENT DOCUMENTS

| 2,019,208 A | 10/1935 | Baumann et al. |
| 3,993,119 A | 11/1976 | Scott |
| 4,157,898 A | 6/1979 | Walker et al. |
| 4,906,255 A * | 3/1990 | Nikitina et al. ............... 51/307 |
| 6,287,353 B1 | 9/2001 | Celikkaya |

FOREIGN PATENT DOCUMENTS

FR 2 642 694 8/1990

OTHER PUBLICATIONS

FEPA-standard 43-1:2006: Grains of fused aluminum oxide, silicon carbide and other abrasive materials for coated abrasives Macrogrits P 12 to P 220—http://www.fepa-abrasives.org/DesktopDefault.aspx?portalname=www.fepa-abrasives.org&language=E&folderindex=0&folderid=3&headingindex=5&headingid=80&tabindex=1&tabid=273.*
"Influence of MgO on Production Process and Material Characteristics of MAS Series Corundum Ceramics", Jiangsu Ceramics, vol. 67, No. 4, 1994, pp. 1-7.

* cited by examiner

*Primary Examiner*—Karl E Group
*Assistant Examiner*—Noah S Wiese
(74) *Attorney, Agent, or Firm*—Young & Thompson

(57) ABSTRACT

Molten ceramic grains are intended, for example, for applications involving abrading tools, having the following average chemical weight composition, expressed in weight percent based on oxide content: $Al_2O_3$: 93% to 97.5%; MgO: 2.2 to 6.5%; $SiO_2$: <0.1%; other impurities: <0.4%.

11 Claims, 3 Drawing Sheets

White corundum

Figure 1: White corundum

Figure 2: Cerpass

200 μm

ALUMINUM-AND MAGNESIUM-BASED MOLTEN CERAMIC GRAINS

BACKGROUND OF THE INVENTION

The invention relates to alumina-based ceramic grains obtained by fusion.

Aluminous ceramic grains are useful, among other applications, for the manufacture of abrasive tools. In general, abrasive tools are classified according to the method of forming the ceramic grains of which they are composed: free abrasives (grains used by spraying them or used in suspension, with no backing); coated abrasives (a cloth or paper type backing coated with the grains, these being conventionally arranged in several layers); and bonded abrasives (bonded grains in the form of grinding wheels, sticks, etc.).

In the case of bonded abrasive tools, the abrasive grains are pressed with an organic or glassy binder. Glassy binders generally consist of oxides, essentially silicates. The bonded grains must themselves exhibit good mechanical abrasion properties, in particular must have good toughness. They must also be able to be bonded strongly to the binder (interfacial strength).

At the present time, there are various families of ceramic grains that allow all these applications to be covered with a variety of performance. In particular, two large families can be distinguished in which the grains are obtained by a sol-gel method or by fusion.

The sol-gel method, as described for example in EP 1 228 018 (U.S. Pat. No. 6,287,353), makes it possible to manufacture grains with a very fine crystalline structure, conventionally on a submicron scale, which gives them excellent cutting effectiveness and a long life time. However, the productivity of the sol-gel method is low and incurs high manufacturing costs.

Fused grains, obtained by fusing the raw materials or "fused grains", conventionally have much coarser crystalline structures and have a lower cutting effectiveness and a shorter life time. Fused grains containing mainly alumina are described, for example, in U.S. Pat. No. 4,157,898. The main advantage of these grains is their low manufacturing cost.

The composition of the grains is important, but the manufacturing process also plays a determining role on the performance. Thus, for a given composition, a microstructure obtained by the sol-gel route, and offering advantageous properties, cannot easily be obtained by fusion.

Table 1 below provides, for comparison, the results in a fracturing resistance test (test A), described in greater detail later on in the description, for two high-alumina abrasive grains of the prior art. These two grains are manufactured and sold by Saint-Gobain Industrial Ceramics. The white corundum grain is obtained by fusion and the Cerpass grain by the sol-gel method. As table 1 shows, the chemical compositions are very similar (the balance is alumina). However, white corundum gives a 119% result in test A, whereas Cerpass gives 375%.

FIGS. 1 and 2 appended hereto show, in cross section, white corundum and Cerpass grains, respectively.

There is therefore a need for fused aluminous grains offering better performance both in terms of life time and cutting effectiveness than that of the current fused aluminous grains, but which can be manufactured for a substantially lower cost than that of the aluminous grains obtained by the sol-gel method.

SUMMARY OF THE INVENTION

The objective of the present invention is to satisfy this need.

According to the invention, this objective is achieved by means of fused grains having the following average chemical composition by weight, in percentages by weight on the basis of the oxides:

$Al_2O_3$: 93% to 98.5%;
MgO: 2.2 to 6.5%;
$SiO_2$: <0.1%;
other impurities: <0.4%.

As will be seen later, such grains, manufactured by fusion, are inexpensive but nevertheless have a long life time and excellent cutting effectiveness.

Unless mentioned to the contrary, the percentages used in the present application always refer to percentages by weight on the basis of the oxides.

According to other preferred features of the invention:

the minimum magnesia (MgO) content, as a percentage by weight on the basis of the oxides, is 2.3%, preferably 2.45% and the maximum MgO content, as a percentage by weight on the basis of the oxides, is 4%, preferably 2.5%;

the maximum carbon content is 250 ppm, preferably 200 ppm; and the maximum $Na_2O$ content, as a percentage by weight on the basis of the oxides, is 0.1%, preferably 0.05%.

The invention also relates to a process for manufacturing ceramic grains, which comprises the following successive steps:

a) preparation of a mixture of raw materials having the following average chemical composition by weight, as percentages by weight on the basis of the oxides:

$Al_2O_3$: 93% to 97.5%;
MgO: 2.2 to 6.5%;
$SiO_2$: <0.1%;
other impurities: <0.4%;

b) fusion, in an electric arc furnace, by means of a short arc and with a melting energy before casting between 2000 and 2500 kWh per ton of said mixture of raw materials, under defined reducing conditions so that the product obtained after the following step c) has a maximum carbon content of 250 ppm;

c) casting and quench cooling, preferably so that the molten liquid solidifies entirely in less than 3 minutes; and d) grinding of the cooled product.

TABLE 1

|  | $SiO_2$ | $TiO_2$ | $Na_2O$ | MgO | CaO | $Fe_2O_3$ | $Cr_2O_3$ | Test A |
|---|---|---|---|---|---|---|---|---|
| White corundum | <0.1% | <0.05% | 0.27% | <0.02% | <0.02% | 0.02% | — | 119 |
| Cerpass | 0.061% | 0.096% | <0.03% | 0.009% | 0.014% | — | 0.003% | 375 |

According to other preferred features of the process according to the invention:
said mixture of raw materials also contains between 0.8 to 5.5 wt %, preferably 2.5 wt %, carbon and/or between 0.8 and 5.5 wt %, preferably 2.5 wt %, aluminum metal chips;
said mixture of raw materials contains, as a percentage by weight on the basis of the oxides, a minimum magnesia (MgO) content of 2.3%, preferably 2.45%, and a maximum MgO content of 4%, preferably 2.5%;
the process includes, after step d), a calcination step in an oxidizing atmosphere at a temperature above 1250° C., preferably above 1350° C. and more preferably above 1400° C., the calcination temperature preferably being maintained for a time of at least 30 minutes; and
the process includes a final step, of screening the ground grains and selecting the screened grains, the selected grains preferably having a grit number of F50 or less according to the FEPA Standard 42-GB-1984.

Finally, the invention relates to the use of the grains according to the invention and/or of the grains obtained by means of the process according to the invention in abrasive products, preferably in bonded products or in coated products.

DETAILED DESCRIPTION OF THE PREFERRED EMBODIMENTS

Figure 1:
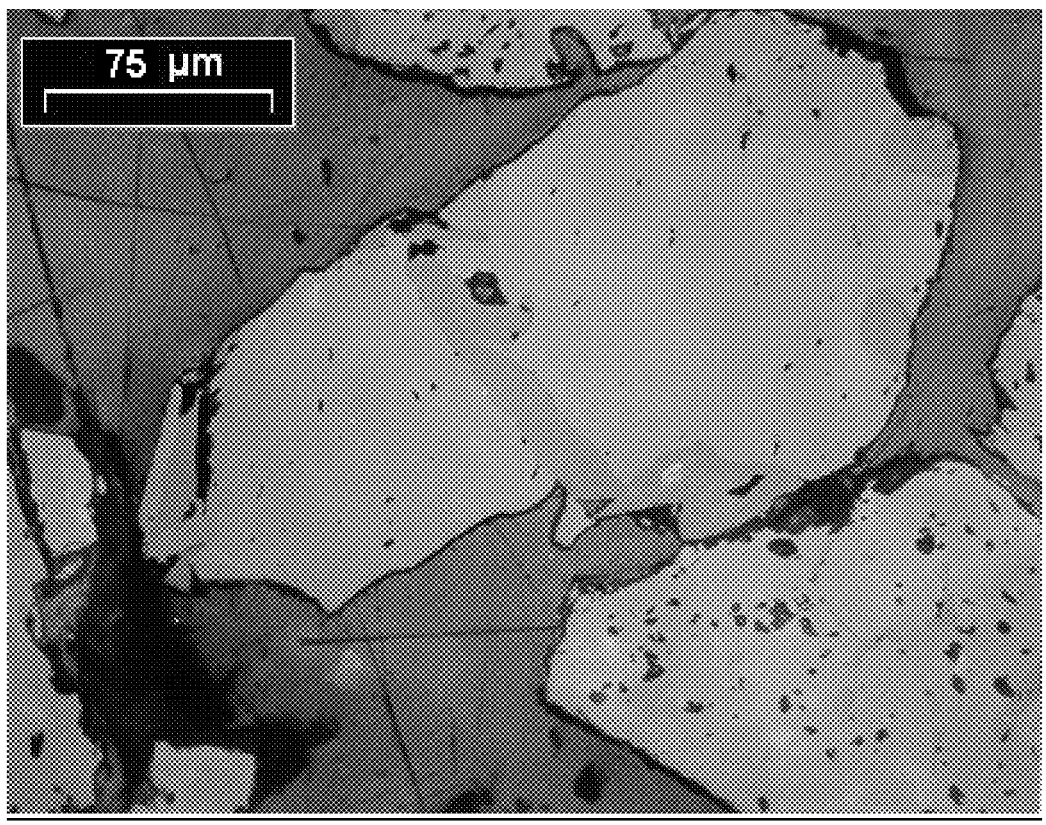
FIG. 1 illustrates white corundum, in cross-section.
Figure 2:
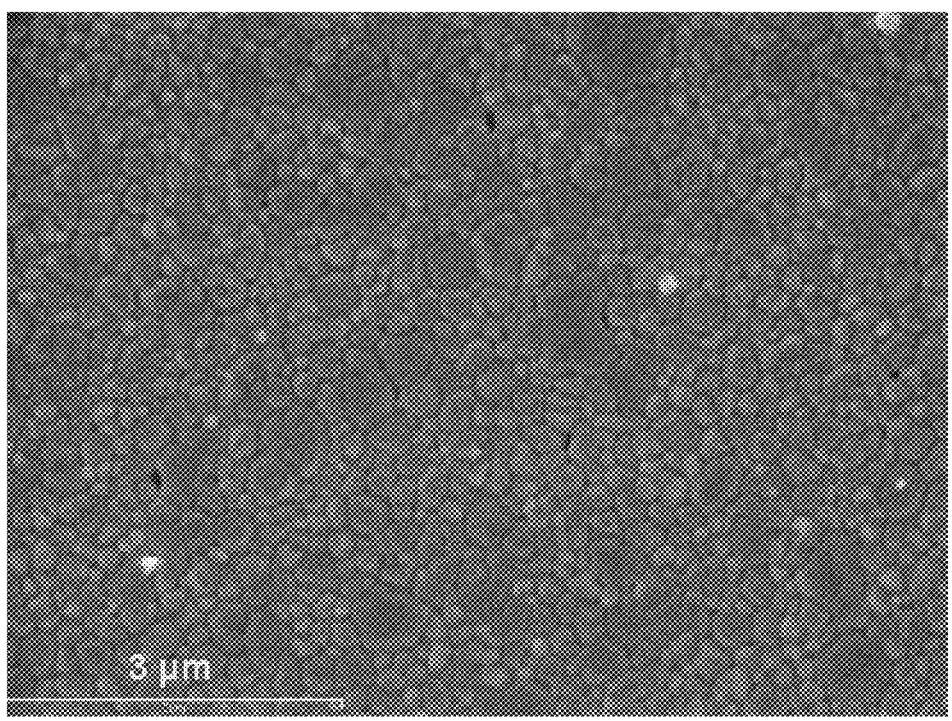
FIG. 2 illustrates Cerpass grains, in cross-section.

The following nonlimiting examples are given for the purpose of illustrating the invention.

The products given as examples were prepared from an initial mixture containing the following raw materials:
alumina of the AR75 type, sold by Pechiney, containing on average 99% $Al_2O_3$;
NedMag® magnesia containing about 98% MgO.

Silica and sodium oxide are known to be deleterious and their respective contents must be limited to trace amounts (<0.1%) introduced by way of impurities into the raw materials. This is because the presence of silica results in the formation of a glassy phase whose influence on the abrasive properties and on the hardness of the grain is deleterious. The presence of sodium oxide, even with low contents, results in the formation of beta-alumina. Now, this crystal form of alumina diminishes the abrasive properties of the grains.

The contents of the other impurities, such as CaO, $TiO_2$, $Fe_2O_3$ or $Cr_2O_3$ must not exceed 0.3%.

The initial mixture was melted in a conventional melting process using an arc furnace in reducing medium, with the addition of 2.5 wt % carbon, for example petroleum coke, pitch or coal, and 2.5 wt % aluminum metal chips. The electric arc was short and the energy before casting was between 2000 and 2500 kWh per tonne of the initial mixture of raw materials. The voltage needed to obtain a short arc depends on many parameters, which are well controlled by those skilled in the art, such as the size of the furnace, the number of electrodes and the size of the electrodes.

The bath of molten raw materials was then rapidly cooled, in order to promote the formation of fine oriented structures, by means of casting devices in which the material is cast between thin metal plates, such as the devices presented in patent U.S. Pat. No. 3,993,119.

The cooled molten material or "crude" was then ground, for example in roll grinders, then screened and classified in series of particle size distributions ("number" or "grit") according to the FEPA (Fédération Européene des Fabricants de Produits Abrasifs) Standard 42-GB-1984.

According to the invention, to improve the impact strength and the abrasion performance of the grains obtained, they were then subjected to a heat treatment step. Preferably, the heat treatment comprises a calcination in an oxidizing atmosphere, preferably in air, at a temperature above 1250° C., preferably above 1350° C. and more preferably above 1400° C., for a time of at least 2 minutes, preferably at least 5 minutes and more preferably at least 30 minutes.

For the examples, the grains were calcined in air at various temperatures for variable times. These operating parameters are given in Table 2 below.

The chemical composition of the products obtained is given in Table 2. This is an average chemical composition, given in percentage by weight.

The chemical composition, excluding the carbon content, was obtained by X-ray fluorescence.

The carbon content, which reflects the oxidation-reduction state, was measured by infrared absorption. To do this, the specimen was milled, after magnetic separation, in a carbon-free milling jar (for example made of fused alumina-zirconia-silica) until a powder passing through a 160 μm screen was obtained. The specimen thus prepared was analyzed using a LECO® model CS300 instrument.

The control grain was a fused aluminous grain produced under reducing conditions and sold under the name 32AII by Saint-Gobain Industrial Ceramics. Its typical chemical composition comprises 99.4% $Al_2O_3$, 0.4% $TiO_2$, less than 0.1% $Na_2O$ and less than 0.02% $SiO_2$.

To characterize their mechanical properties, the grains were subjected to a fracturing resistance test (test A). The aim of this test was to determine the fraction of surviving grains of a given particle size cut after a milling operation in a steel milling jar.

An AUREC type T100 rotary mill was used, which rotated a hollow cylindrical jar containing the grains and also a ring and a disc. The jar was made of a Z200C12 grade steel and had an inside diameter of 140 mm and a height of 18 mm. The disc was cylindrical and hollow (diameter 75 mm, height 46 mm and wall thickness 10 mm). The disc and the ring were made of steel of the same grade as the jar.

The grains were firstly screened and classified according to the following fractions to be tested:
710/850 μm, to represent the grain of F24 grit number;
500/600 μm, to represent the grain of F36 grit number;
300/355 μm, to represent the grain of F54 grit number;
250/300 μm, to represent the grain of F60 grit number;
180/212 μm, to represent the grain of F80 grit number; and
106/125 μm, to represent the grain of F120 grit number.

The grains were then de-ironed by magnetic separation. The jar was cleaned with compressed air before a specimen consisting of 25 grams of grains was introduced therein. The mill was then rotated at its nominal speed (1400 rpm) for 5 seconds. The specimen was then extracted using a brush (No. 50). Its particle size distribution was then analyzed by introducing it onto a series of screens using a ROTAP screening device for 5 minutes. The mass of grains not passing through the screen of 425 μm opening was then measured. This mass, given as a percentage relative to the remaining mass under the same conditions for the control specimen, corresponds to the result of test A.

It is considered that the value obtained in the test A must be greater than 190 (that is to say the mass of grains not passing through the screen of 425 μm opening is at least 1.9 times greater than that of the control), and preferably must be greater than 300 (that is to say the mass of grains not passing through the screen of 425 μm opening is at least 3 times greater than that of the control) in order for the effect to be sufficiently marked for these grains to be able to be used in abrasive products.

To evaluate the cutting effectiveness of the grains obtained, we employed the following test B.

In this test, the preparation of the specimens was identical to that of test A. The same apparatus and the same operating method were used. After screening the tested specimen, the entire specimen was reintroduced into the mill for 145 seconds. The specimen was then extracted using a hard brush and the iron content was measured by X-ray diffraction. This value, given as a percentage relative to the value obtained in the same test for the control specimen, is the result of test B.

It is considered that the value obtained in test B must be greater than or equal to 70% in order for the cutting effectiveness to be satisfactory.

Preferably, the maximum MgO content is 4%, more preferably 2.5%.

Figure 3:
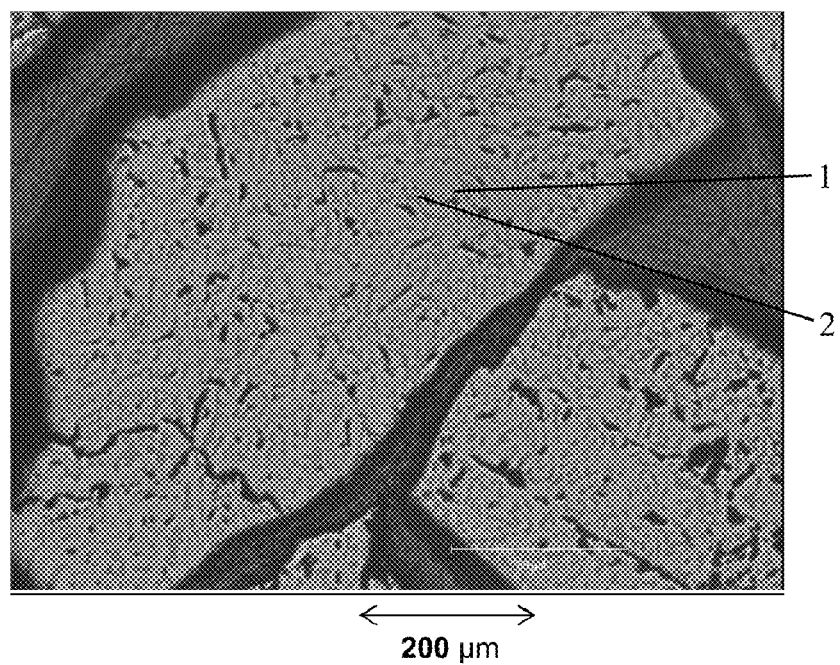
FIG. 3 illustrates corundum crystals surrounded by a non-stoichiometric MgO—$Al_2O_3$ spinel phase.

Complementary analyses (by scanning electron microscopy) for studying the crystalline phases showed that the products of the invention consisted of corundum crystals 1 (alpha-alumina) surrounded by a nonstoichiometric MgO—$Al_2O_3$ spinel phase 2 (see appended FIG. 3). The mean size of the corundum crystals is 18 to 20 μm. Typically, 90% of the crystals have a size of greater than 9 μm and 90% have a size of less than 27 μm. 100% of the crystals have a size of greater than 5 μm.

Comparison between Examples 13 and 14, or between Examples 23 and 24, or between Examples 26, 27 and 28, illustrates the influence of the grain size. The grains have a better fracturing resistance and a better cutting capacity the coarser they are, that is to say the smaller their grit number.

For highly demanding applications, for example when used in a high-pressure grinding tool, it is preferred to select the coarsest grains, preferably the coarse grains having a grit

TABLE 2

| Ex. | Heat treatment (calcination) Temp. (°C.) | Time (min) | Composition in % by weight % $Al_2O_3$ | % MgO | % $SiO_2$ | % $Na_2O$ | Other Impur. | Redox state C (ppm) | Grain size (Grit No.) | Test A | Test B |
|---|---|---|---|---|---|---|---|---|---|---|---|
| 1 | 1400 | 35 | >98.68 | 0.87 | <0.1 | <0.05 | <0.3 | 155 | F24 | 162 | 89 |
| 2 | 1400 | 35 | >98.2 | 1.35 | <0.1 | <0.05 | <0.3 | 113 | F24 | 220 | 67 |
| 3 | 1300 | 60 | >98 | 1.55 | <0.1 | <0.05 | <0.3 | 74 | F24 | 303 | 85 |
| 4 | 1300 | 60 | >97.94 | 1.61 | <0.1 | <0.05 | <0.3 | 83 | F24 | 336 | 83 |
| 5 | 1400 | 120 | >97.78 | 1.75 | <0.1 | 0.07 | <0.3 |  | F24 | 377 | 88 |
| 6 | 1300 | 120 | >97.08 | 2.47 | <0.1 | <0.05 | <0.3 | 175 | F24 | 368 | 98 |
| 7 | 1400 | 5 | >97.08 | 2.47 | <0.1 | <0.05 | <0.3 | 165 | F24 | 305 | 109 |
| 8 | 1400 | 30 | >97.08 | 2.47 | <0.1 | <0.05 | <0.3 | 165 | F24 | 326 | 100 |
| 9 | 1400 | 45 | >97.08 | 2.47 | <0.1 | <0.05 | <0.3 | 170 | F24 | 382 | 93 |
| 10 | 1400 | 120 | >97.08 | 2.47 | <0.1 | <0.05 | <0.3 | 168 | F24 | 349 | 98 |
| 11 | 1400 | 600 | >97.08 | 2.47 | <0.1 | <0.05 | <0.3 | 165 | F24 | 351 | 100 |
| 12 | 1400 | 120 | >96.85 | 2.68 | <0.1 | 0.07 | <0.3 |  | F24 | 388 | 85 |
| 13 | 1400 | 35 | >96.26 | 3.39 | <0.1 | <0.05 | <0.2 |  | F24 | 303 |  |
| 14 | 1400 | 35 | >96.26 | 3.39 | <0.1 | <0.05 | <0.2 |  | F54 | 158 |  |
| 15 | 1400 | 40 | >96.26 | 3.39 | <0.1 | <0.05 | <0.2 |  | F80 | 106 |  |
| 16 | 1400 | 45 | >96.03 | 3.6 | <0.1 | 0.07 | <0.2 | 315 | F36 | 206 | 67 |
| 17 | 1400 | 50 | >95.89 | 3.76 | <0.1 | <0.05 | <0.2 | 220 | F36 | 275 | 70 |
| 18 | 1400 | 45 | >95.89 | 3.76 | <0.1 | <0.05 | <0.2 | 180 | F36 | 193 | 105 |
| 19 | 1300 | 120 | >95.67 | 3.88 | <0.1 | <0.05 | <0.3 | 90 | F24 | 274 | 92 |
| 20 | 1400 | 5 | >95.67 | 3.88 | <0.1 | <0.05 | <0.3 | 80 | F24 | 282 | 94 |
| 21 | 1400 | 30 | >95.67 | 3.88 | <0.1 | <0.05 | <0.3 | 70 | F24 | 314 | 97 |
| 22 | 1400 | 120 | >95.67 | 3.88 | <0.1 | <0.05 | <0.3 | 72 | F24 | 333 | 92 |
| 23 | 1400 | 45 | >95.77 | 3.88 | <0.1 | <0.05 | <0.2 |  | F24 | 324 | 82 |
| 24 | 1400 | 45 | >95.77 | 3.88 | <0.1 | <0.05 | <0.2 |  | F60 | 134 | 68 |
| 25 | 1400 | 60 | >95.69 | 3.95 | <0.1 | 0.06 | <0.2 |  | F36 | 334 | 83 |
| 26 | 1400 | 60 | >95.69 | 3.95 | <0.1 | 0.06 | <0.2 |  | F60 | 137 | 64 |
| 27 | 1400 | 60 | >95.69 | 3.95 | <0.1 | 0.06 | <0.2 |  | F120 | 99 | 67 |
| 28 | 1400 | 20 | >95.69 | 3.95 | <0.1 | 0.06 | <0.2 |  | F60 | 98 |  |
| 29 | 1300 | 20 | >95.69 | 3.95 | <0.1 | 0.06 | <0.2 |  | F60 | 97 |  |
| 30 | 1400 | 35 | >95.11 | 4.54 | <0.1 | <0.05 | <0.2 | 75 | F24 | 320 | 74 |
| 31 | 1400 | 35 | >94.41 | 5.24 | <0.1 | <0.05 | <0.2 |  | F24 | 316 | 73 |
| 32 | 1400 | 45 | >93.53 | 6.12 | <0.1 | <0.05 | <0.2 | 93 | F24 | 309 | 71 |
| 33 | 1400 | 45 | >93.06 | 6.59 | <0.1 | <0.05 | <0.2 | 87 | F24 | 305 | 62 |
| 34 | 1400 | 120 | >92.54 | 7.01 | <0.1 | <0.05 | <0.3 | 106 | F24 | 290 | 51 |

The examples in Table 2 demonstrate that an MgO content of greater than 1.5% is necessary for the fracturing resistance of the grains to be improved. Table 2 also indicates that an MgO content of greater than 6.5% degrades the quality of the grain obtained, in particular its cutting effectiveness, but also the fracturing resistance is degraded too.

Preferably, the minimum MgO content is 2.2%, more preferably 2.45%.

number of F60 or lower, preferably a grit number of lower than F50, and more preferably a grit number of lower than F36.

The melting step of the process according to the invention under reducing conditions generates products having a low carbon content. Preferably, the process is carried out, using techniques that are conventional to those skilled in the art, so that the carbon content is less than 250 ppm, preferably less than 200 ppm and more preferably less than 180 ppm.

Advantageously, the carbon content of the grains according to the invention makes them particularly suitable for use in bonded abrasives.

Of course, the present invention is not limited to the embodiments described and shown above, these being provided by way of illustration but implying no limitation.

The invention claimed is:

1. Fused ceramic grains having the following average chemical composition by weight, in percentages by weight on the basis of the oxides:

$Al_2O_3$: 93% to 98.5%;
   MgO: 2.2 to 6.5%;
   $SiO_2$:<0.1%;
   other impurities:<0.4%,
   wherein the maximum carbon content is 200 ppm, and
   wherein the grains consist of corundum crystals surrounded by a nonstoichiometric MgO-$Al_2O_3$ spinel phase.

2. The fused ceramic grains according to claim 1, wherein the minimum MgO content, as a percentage by weight on the basis of the oxides, is 2.3%.

3. The fused ceramic grains according to claim 1, wherein the minimum MgO content, as a percentage by weight on the basis of the oxides, is 2.45%.

4. The fused ceramic grains according to claim 1, wherein the maximum MgO content, as a percentage by weight on the basis of the oxides, is 4%.

5. The fused ceramic grains according to claim 1, wherein the maximum MgO content, as a percentage by weight on the basis of the oxides, is 2.5%.

6. The fused ceramic grains according to claim 1, wherein the maximum $Na_2O$ content, as a percentage by weight on the basis of the oxides, is 0.1%, preferably 0.05%.

7. The fused ceramic grains according to claim 1, wherein the mean size of said corundum crystals is between 18 and 20 μm.

8. The fused ceramic grains according to claim 1, wherein 90% of said corundum crystals have a size of greater than 9 μm and 90% have a size of less than 27 μm.

9. The fused ceramic grains according to claim 1, wherein 100% of said corundum crystals have a size of greater than 5 μm.

10. The fused ceramic grains according to claim 1, having a grit number of F60 or less according to FEPA Standard 42-GB-1984, and presenting the following size distribution, with test sieves according to ASTM E11-87,

| | Test sieve 1 | Test sieve 2 | Test sieve 3 | Test sieves 3 and 4 | Remainder in the bottom pan |
|---|---|---|---|---|---|
| aperture size (μm) | 425 | 300 | 250 | 212 | |
| Residue (%). | 0 | 30 max | 40 min | 65 min | 3 max |

11. The fused ceramic grains according to claim 1, having a grit number of F36 or less according to FEPA Standard 42-GB-1984, and presenting the following size distribution, with rest sieves according to ASTM E11-87

| | Test sieve 1 | Test sieve 2 | Test sieve 3 | Test sieves 3 and 4 | Remainder in the bottom pan |
|---|---|---|---|---|---|
| aperture size (μm) | 850 | 600 | 500 | 425 | |
| Residue (%). | 0 | 25 max | 45 min | 65 min | 3 max |

* * * * *